US010245982B2

(12) United States Patent
Khalid et al.

(10) Patent No.: US 10,245,982 B2
(45) Date of Patent: Apr. 2, 2019

(54) VEHICLE SEAT WITH LATERALLY COLLAPSING PORTION

(71) Applicant: Ford Global Technologies, LLC, Dearborn, MI (US)

(72) Inventors: Umer Khalid, Farmington Hills, MI (US); John Wayne Jaranson, Dearborn, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/441,900

(22) Filed: Feb. 24, 2017

(65) Prior Publication Data

US 2018/0244180 A1 Aug. 30, 2018

(51) Int. Cl.
*A47C 13/00* (2006.01)
*B60N 2/30* (2006.01)
*B60N 2/06* (2006.01)
*B60N 2/02* (2006.01)

(52) U.S. Cl.
CPC .......... *B60N 2/3081* (2013.01); *B60N 2/062* (2013.01); *B60N 2002/0216* (2013.01)

(58) Field of Classification Search
CPC .. B60N 2/3084; B60N 2/3093; B60N 2/3097; B60N 2002/0216; B60N 2/3081; B60N 2/3086; B64D 11/0693
See application file for complete search history.

(56) References Cited

U.S. PATENT DOCUMENTS

| | | | | |
|---|---|---|---|---|
| 371,091 A | * | 10/1887 | Miller | B60N 2/3084 182/223 |
| 972,393 A | * | 10/1910 | Moore | B60N 2/3086 297/233 |
| 1,133,500 A | * | 3/1915 | Pollard | B60N 2/3084 297/112 |
| 1,369,543 A | * | 2/1921 | Reider | B61C 17/04 297/234 |
| 2,187,689 A | * | 1/1940 | Jaray | A47C 17/12 297/107 |
| 2,696,246 A | * | 12/1954 | Putnam | B60N 2/2854 108/129 |
| 3,743,351 A | * | 7/1973 | Harris | A47C 13/00 297/107 |
| 5,098,157 A | | 3/1992 | Surot | |
| 5,106,153 A | * | 4/1992 | Durling | A47C 7/68 297/135 |
| 5,342,111 A | * | 8/1994 | Charles | B60N 2/30 297/232 |
| 5,384,946 A | | 1/1995 | Sundstedt et al. | |
| 5,564,785 A | | 10/1996 | Schultz et al. | |

(Continued)

FOREIGN PATENT DOCUMENTS

EP 0592273 A2 4/1994

*Primary Examiner* — Shin H Kim
(74) *Attorney, Agent, or Firm* — Vichit Chea; Price Heneveld LLP (57) ABSTRACT

A vehicle seat includes cushion and a seatback coupled with the cushion. At least one of the seatback and the cushion includes a base body defining an internal cavity open on a side of the base portion and a secondary body slidably mounted with the base body so as to be extendible out of the internal cavity beyond the side of the base body and retractable at least partially within the cavity.

19 Claims, 8 Drawing Sheets

(56) References Cited

U.S. PATENT DOCUMENTS

| | | | |
|---|---|---|---|
| 5,660,436 A * | 8/1997 | Wilson | A47C 1/023 297/233 |
| 5,735,573 A * | 4/1998 | Vredevoogd | A47C 1/0242 297/188.01 |
| 5,984,397 A | 11/1999 | Dawson et al. | |
| 6,609,745 B2 | 8/2003 | Miyahara et al. | |
| 7,070,239 B1 * | 7/2006 | Ugrekhelidze | B60N 2/3084 297/105 |
| 8,033,604 B2 * | 10/2011 | Behrens | B60N 2/3011 297/188.1 |
| 8,118,359 B2 | 2/2012 | Kyogoku et al. | |
| 8,162,396 B2 * | 4/2012 | Edwards | A47C 4/02 297/188.08 |
| 8,240,754 B2 | 8/2012 | Maier | |
| 8,251,427 B2 * | 8/2012 | Lindsay | B60N 2/062 296/64 |
| 8,596,720 B2 * | 12/2013 | Ootsuka | B60N 2/0296 296/65.11 |
| 8,708,410 B2 * | 4/2014 | Scott | B64D 11/06 297/234 |
| 9,359,079 B2 * | 6/2016 | Scott | B64D 11/0601 |
| 9,888,781 B2 * | 2/2018 | Wallis | A47C 17/04 |
| 2004/0160080 A1 * | 8/2004 | Shibata | B60N 2/01 296/64 |
| 2004/0227386 A1 * | 11/2004 | Tsujibayashi | B60N 2/01583 297/344.1 |
| 2008/0185893 A1 * | 8/2008 | Behrens | B60N 2/3011 297/378.1 |
| 2009/0008975 A1 * | 1/2009 | Behrens | B60N 2/3011 297/236 |
| 2010/0032976 A1 * | 2/2010 | Yamashita | B60N 2/0155 296/24.3 |
| 2010/0117393 A1 * | 5/2010 | Yamashita | B60N 2/01508 296/37.8 |
| 2010/0140996 A1 * | 6/2010 | Winter | B60N 2/062 297/248 |
| 2010/0194135 A1 * | 8/2010 | Jones | B60N 2/3002 296/66 |
| 2012/0056456 A1 * | 3/2012 | Woolston | B60N 2/01583 297/236 |
| 2012/0169099 A1 * | 7/2012 | Horiguchi | B60N 2/0232 297/314 |
| 2013/0038103 A1 * | 2/2013 | Scott | B64D 11/06 297/248 |
| 2015/0015047 A1 * | 1/2015 | Uebelacker | B60N 2/2222 297/383 |
| 2015/0158593 A1 * | 6/2015 | Quatmann | B60N 2/26 297/230.1 |
| 2016/0107544 A1 * | 4/2016 | Byun | B60N 2/062 297/232 |

* cited by examiner

VEHICLE SEAT WITH LATERALLY COLLAPSING PORTION

FIELD OF THE DISCLOSURE

The present disclosure generally relates to a vehicle seat. In particular, the vehicle seat is in the form of a bench seat with a laterally-collapsing portion to facilitate a reduction in width thereof during access to certain portions of the associated vehicle.

BACKGROUND OF THE DISCLOSURE

Vehicles having three-row seating arrangements are increasingly popular. Such vehicles, including variations of sport utility vehicles ("SUVs"), crossovers, minivans, and the like maintain a typical four-door arrangement for access to the interior thereof, with the front doors designated for access to the front seats (driver and passenger) and the rearward doors being used for access to both the second row (or middle row) seats and the third row seats, which are disposed rearward of the middle row in a portion of what is usually or alternately occupied by the cargo area of the vehicle. In instances where a bench seat, in particular, is used for the second row seats, access to the third row is obstructed by the second row seats. Various mechanisms have been incorporated into the second row seats to provide folding and/or sliding thereof in the forward direction away from the third row to attempt to provide improved access to the third row. Such mechanisms are limited in their range of motion and may still provide passages that are difficult to navigate, particularly by adults. Further, such mechanisms typically require that the outward positions of the second row be unoccupied, requiring passengers therein to exit the vehicle and prohibiting access through a side of the vehicle in which a child car seat is installed.

SUMMARY OF THE DISCLOSURE

According to one aspect of the present disclosure, a vehicle seat includes a cushion and a seatback coupled with the cushion. At least one of the seatback and the cushion includes a base body defining an internal cavity open on a side of the base portion and a secondary body slidably mounted with the base body so as to be extendible out of the internal cavity beyond the side of the base body and retractable at least partially within the cavity.

Embodiments of the first aspect of the invention can include any one or a combination of the following features:
  each of the seatback and the cushion respectively includes a support structure and a coverstock defining a first seating surface, the base body included in the at least one of the seatback and the cushion includes the support structure and the coverstock of the at least one of the seatback and the cushion, and the cavity is defined by the support structure and is inside the coverstock of the at least one of the seatback and the cushion;
  the at least one of the seatback and the coverstock includes an extension member coupled between the base body and the secondary body;
  the extension member includes a retention portion coupled with the base body and a telescoping portion slidably received with the retention portion and coupled with the secondary body;
  the base body defines a first seating surface and the secondary body defines a second seating surface positionable laterally adjacent to the first seating surface by extension of the secondary body;
  the secondary body is also moveable with respect to the base body in a direction normal to the first seating surface to align the second seating surface with the first seating surface in the direction normal to the first seating surface when the secondary body is extended out of the external cavity and to position the second seating surface below the first seating surface when the secondary body is retracted at least partially within the cavity;
  the base body is a first base body and the at least one of seatback and cushion further includes a second base body defining an internal cavity open on a side of the second base portion facing the side of the first base body, the secondary body being further slidably mounted with the second base body so as to be extendible out of the internal cavity of the second base body beyond the side thereof and retractable at least partially within the cavity of the second base body;
  the seat is configurable between a first condition, wherein portions of the secondary body are respectively retracted within the internal cavities of the first base body and the second base body and a second condition, wherein the secondary body is extended from the cavities of both the first base body and the second base body; the seat may define a first width in the first configuration and a second width in the second configuration, the second width being greater than the first width; or
  each of the seatback and the cushion includes respective base bodies and secondary bodies, each of the secondary bodies being slidably mounted with the corresponding base body so as to be extendible out of the corresponding internal cavity beyond the corresponding side of the base body and retractable at least partially within the corresponding cavity.

According to another aspect of the present disclosure, a vehicle seat assembly includes a first side portion including a first cushion and a first seatback and a second side portion including a second cushion and a second seatback and slidably mounted with respect to the first side portion. The assembly further includes a central portion coupled between at least one of the cushions or the seatbacks of the first side portion and the second side portion and collapsible during sliding of the second side portion toward the first side portion.

According to another aspect of the present disclosure, a vehicle includes a seat having a cushion and a seatback coupled with the cushion. At least one of the seatback and the cushion includes a base body defining an internal cavity open on a side of the base portion and a secondary body slidably mounted with the base so as to be extendible out of the internal cavity beyond the side of the base body and retractable at least partially within the cavity.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
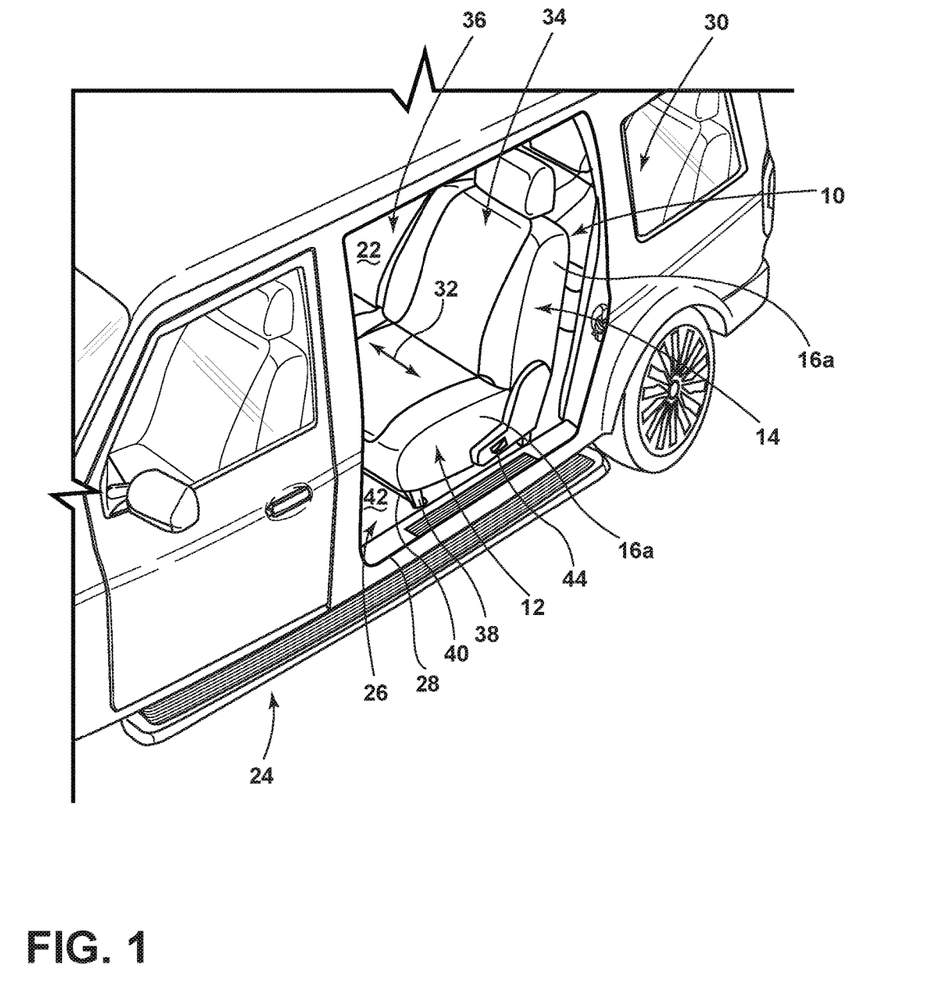
FIG. 1 is a perspective view showing a portion of a vehicle open to a portion of the interior thereof including a seat according to an aspect of the disclosure.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIGS. 1-4B, reference numeral 10 generally designates a vehicle seat. Vehicle seat 10 includes a cushion 12 and a seatback 14 coupled with the cushion 12. At least one of the seatback 14 and the cushion 12 includes a base body 16 defining an internal cavity 18 open on a side 20 of the base body 16. The at least one of the seatback 14 and the cushion 12 further includes a secondary body 22 slidably mounted with the base body 16 so as to be extendible out of the internal cavity 18 beyond the side 20 of the base body 16 and retractable at least partially within the cavity 18.

As shown in FIG. 1, the vehicle seat 10 can be included in a vehicle 24, such as that which is depicted in the form of a sport utility vehicle ("SUV") or a "crossover" having three seating rows. When mounted in the interior 26 of such a vehicle 24, the present seat 10 can be mounted in vehicle 24 in the position of the middle, or second row seats, which, as depicted, is directly accessible by or otherwise adjacent to the rear doors 28 (depicted as the door openings, the actual vehicle doors being understood as having been removed for purposes of illustration). As shown in FIG. 1, such a middle row seat 10 can obstruct the access by a passenger to a third row seat 30 positioned behind seat 10. In this manner, accommodations may be made within the structure of seat 10 to allow access to the third row seat 30 through doors 28. In particular, both of the cushion 12 and seatback 14 of seat 10 can include a respective base body 16a and a secondary body 22 such that the above-described collapsing of secondary bodies 22 into the respective cavities 18 (FIG. 4A) within base bodies 16, such as bodies 16a, shown in FIG. 1, can facilitate the movement of base bodies 16a collectively inward away from door 28 in lateral direction 32.

As further shown in FIG. 1, seat 10 can be structured such that the above-described pair of base bodies 16a, which are respectively included in cushion 12 and seatback 14 can be coupled together (including rotatably coupled to facilitate adjustment by a user) such that base bodies 16a comprise a first side portion 34 of seat 10 with the secondary bodies 22 that respectively extend from and collapse into base bodies 16a similarly comprising a central portion 36 of seat 10. In such an embodiment, secondary bodies 22 may be coupled together or may be left uncoupled with the respective coupling thereof with base bodies 16a supporting secondary bodies 22 in the desired locations within cushion 12 and seatback 14, respectively. In this manner, first side portion 34 can be slidably mounted within the interior 26 of vehicle 24 by way of mounts 38 rigidly coupled with the base body 16a within the cushion 12 portion of first side portion 34 of seat 10, which are further slidably coupled with tracks 40 exposed or otherwise mounted on the interior floor 42 of vehicle 24. Tracks 40 extend in lateral direction 32 and include locking features that can engage with a mating locking feature in one or more of mounts 38 such that first side portion 34 can be retained in the outward position shown in FIG. 1 by releasable fixation with one or both of the tracks 40. Upon release of the locking feature (such as by depressing button 44 or moving a lever) or otherwise, first side portion 34 can move inward in lateral direction 32 away from door 28 by movement of mounts 38 in tracks 40, as facilitated by collapsing of the central portion 36 at least partially into first side portion 34. With first side portion 34 in such a position, easy access to third row 30 through door 28 can be gained, including in a use-case where a child car seat or even a passenger is in first side portion 34 of seat 10.

Figure 2:
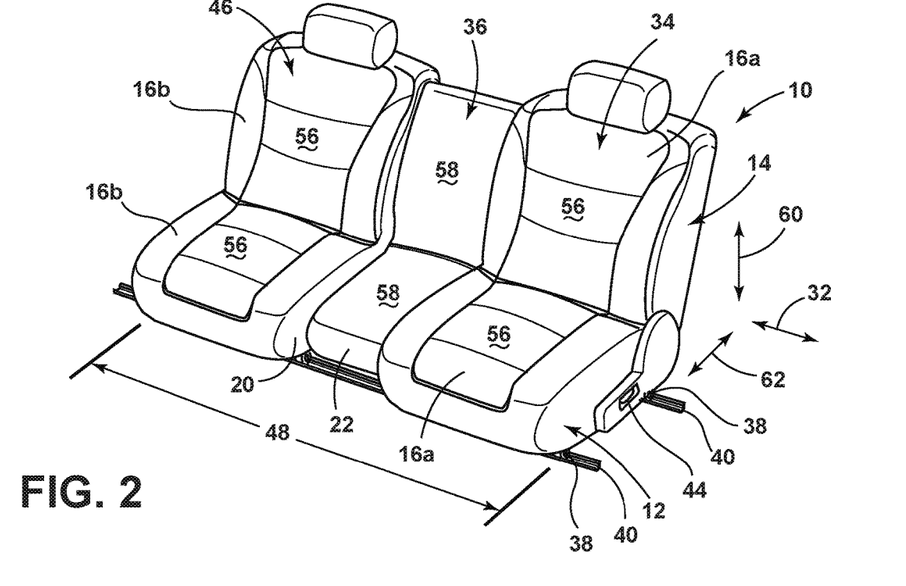
FIG. 2 is a perspective view of the seat of FIG. 1 in an expanded configuration.
Figure 3:
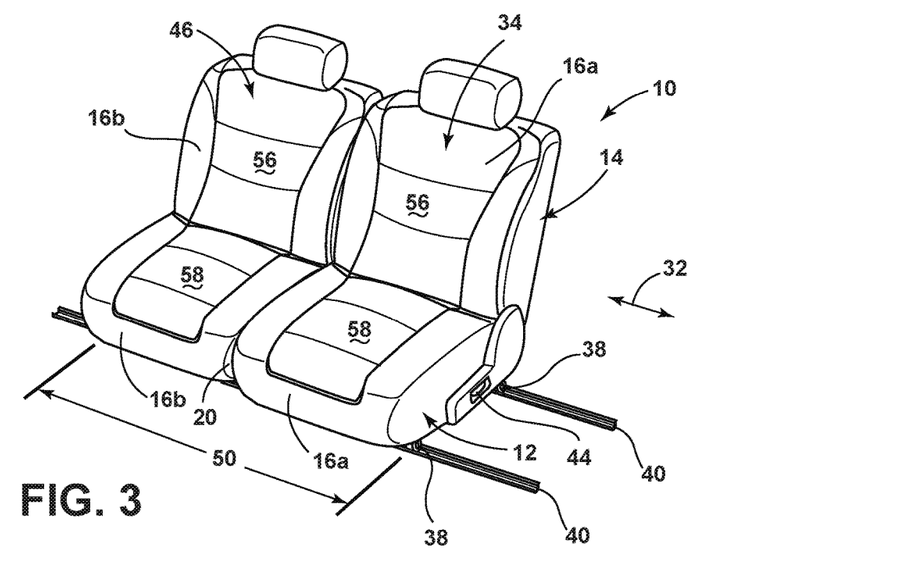
FIG. 3 is a perspective view of the seat in a collapsed configuration.

As further shown in FIGS. 2 and 3, seat 10 can include a second side portion 46 oppositely disposed on central portion 36 from first side portion 34. In a similar manner to first side portion 34, second side portion 46 can include a base body 16b respectively included in cushion 12 and seatback 14 of seat 10, such base bodies 16 being similarly coupled together and slidably mounted on tracks 40 by way of additional mounts 38. As depicted, the secondary bodies 22 of central portion 36 can also be slidably received within cavities 18 (FIG. 4A) of base bodies 16b of second side portion 46 of seat 10. In this manner, during the above-described sliding of first side portion 34 in lateral direction 32, central portion 36 can partially collapse into both of first side portion 34 and second side portion 46 such that the facing sides 20 of base bodies 16*a* and 16*b* are brought into close proximity to or contact with each other. This arrangement allows for configuration of seat 10 between the extended configuration shown in FIGS. 1 and 2 and the collapsed configuration shown in FIG. 3, with the seat 10 having a first width 48 in the extended configuration and a second width 50 in the second configuration that is less than the first width 48. The slideable mounting of second side portion 46 with tracks 40 can further facilitate similar movement of second side portion 46 such that seat 10 can be moved into the second configuration with second side portion 46 positioned away from the corresponding rear door 28 of vehicle 24 and first side portion 34 positioned adjacent door 28.

Figure 4A:
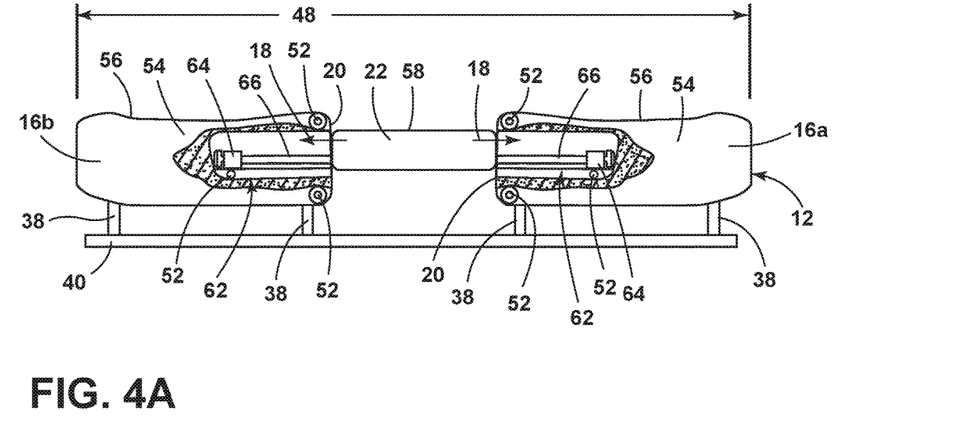
FIG. 4A is a front, partial cutaway view of the cushion of the seat in the expanded configuration showing various internal structures thereof.
Figure 4B:
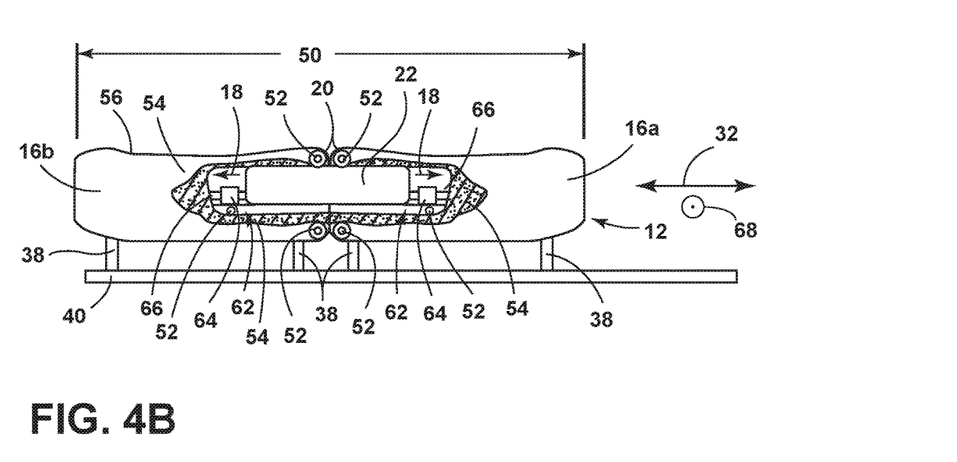
FIG. 4B is a front, partial cutaway view of the cushion of the seat in the collapsed configuration showing various internal structures thereof.

Turning to FIGS. 4A and 4B, various internal structures of seat 10 are shown that facilitate the above-described collapsing of secondary bodies 22 into the respective opposite base bodies 16*a* and 16*b*. In particular, each base body 16*a* and 16*b* includes a support structure 52 enclosed by and generally providing support and shape for an outer coverstock 54. The respective coverstocks 54 of base bodies 16*a* and 16*b* each define respective primary seating surfaces 56 for seat 10 that are located over both the cushion 12 and seatback 14 within the respective first 34 and second 46 side portions. As shown, the inward-facing sides 20 of base bodies 16*a* and 16*b* are also externally defined by coverstock 54, which is open on the respective sides 20 to the cavities 18 within base bodies 16*a* and 16*b*. Cavities 18 are internally defined by open areas within support structures 52 and are further enclosed by coverstocks 54 such that cavities 18 are obscured from view, the secondary bodies 22 respectively obscuring the openings to cavities 18 on sides 20. Secondary bodies 22 can be similarly constructed with respective coverstocks 54 thereof defining secondary seating surfaces 58 over respective portions of cushion 12 and seatback 14.

When seat 10 is in the extended configuration shown in FIG. 4A, secondary seating surface 58 is positioned laterally adjacent both primary seating surfaces 56 such that a generally continuous outer surface of seat 10 is available for occupation, for example, by one, two, or three passengers distributed thereover. As shown in FIG. 4B, when seat 10 is in the collapsed configuration, secondary seating surface 58 laterally overlaps with respective portions of primary seating surfaces 56 by way of the above-described collapsing of secondary bodies 22 into base bodies 16*a* and 16*b*. As further shown, the present embodiment allows such lateral overlapping of seating surfaces 56 and 58 by positioning the portion of secondary seating surface 58 on cushion 12 beneath the corresponding portions of primary seating surfaces 56 in vertical direction 60 (FIG. 2) such that secondary body 22, as shown in FIG. 4B, can slide directly into cavity 18. In a similar manner, the portion of secondary seating surface 58 on seatback 14 are positioned behind the corresponding portions of primary seating surfaces 56 in longitudinal direction 68. Other aspects of base bodies 16*a* and 16*b*, as well as secondary bodies 22 within seatback 14, are also generally similar in construction to that which is discussed herein with respect to cushion 12.

As further shown in FIGS. 4A and 4B, the slideable mounting of secondary bodies 22 with the corresponding base bodies 16*a* and 16*b* can be achieved using corresponding extension members 62 coupled on opposing sides of the secondary body 22 and with the corresponding support structure 52 of the base body 16*a* or 16*b*. By way of example, the extension members 62 can each include a retention portion 64 rigidly coupled with support structure 52 and a telescoping portions 66 that is rigidly coupled with secondary body 22 and slideably received within and supported by the corresponding retention portion 64. The telescoping portions 66 can be generally rigid members that, in one example, may be tubular and may comprise metal, including steel, stainless steel, aluminum or the like. The retention portions 64 can be structured to closely receive the telescoping portions 66 therein and can include bushings and/or bearings to facilitate the above-described slideable arrangement with telescoping portions 66. Further, multiple telescoping portions 66 can be coupled with each side of secondary body 22 and can be received within a corresponding one of multiple retention portions 64 coupled with support structures 52 at appropriate locations. In an example, two extension members 62 can couple secondary body 22 with base body 16*a*, such extension members 62 being spaced in longitudinal direction 68 to provide adequate torsional support for secondary body 22 with respect to base body 16*a*. A similar arrangement can be used to couple secondary body 22 with base body 16*b* such that four total extension members 62 support secondary body 22. A similar arrangement can be used in seatback 14.

Extension members 62 can be configured to limit the sliding movement of telescoping portion 66 with respect to retention portions 64, such as to half of the total distance by which base bodies 16*a* or 16*b* can be moved in lateral direction 32 such that even spacing of central portion 36 is achieved with respect to first 34 and second 46 side portions of seat 10 during movement into the extended configuration. Other arrangements may also be employed to achieve such spacing, including the use of various cable and pulley arrangements or the use of extension members 62 configured similarly to drawer slides with coordinated movement between the corresponding retention portions 64 and telescoping portions 66. Still further, the use of oppositely-extending extension members 62 to couple secondary bodies 22 with oppositely positioned base bodies 16*a* and 16*b* may provide sufficient support for secondary bodies 22 in the corresponding vertical 60 and longitudinal directions 68, as applicable; however, in arrangements (an example of which is discussed below) where only a single base body 16*a* or 16*b* supports secondary body 22, retention portions 64 of extension members 62 may be elongated in the lateral direction 32 to provide sufficient support for a cantilevered arrangement of telescoping portions 66 when secondary body 22 is in an extended condition.

Figure 5:
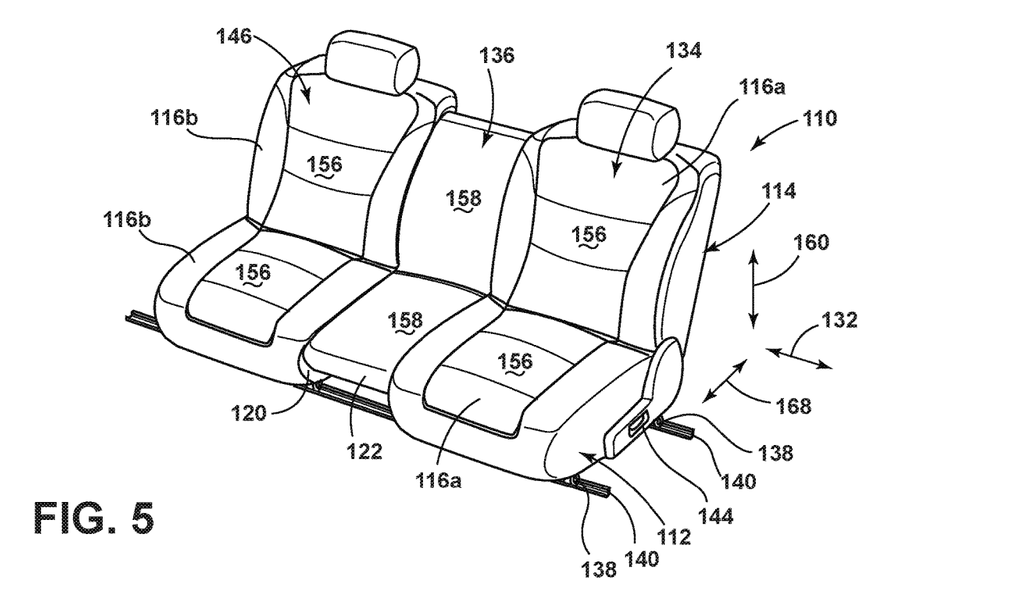
FIG. 5 is a perspective view of the a vehicle seat according to a further aspect in an expanded configuration.
Figure 6:
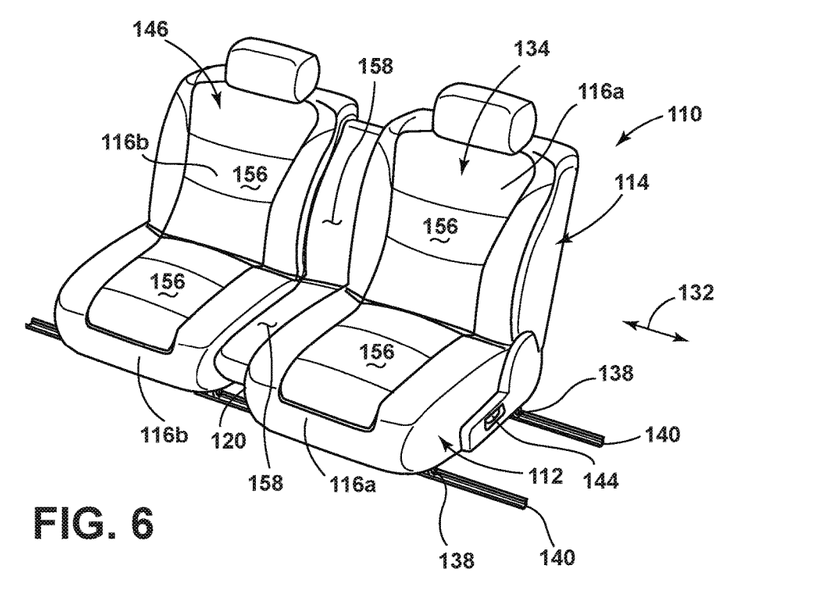
FIG. 6 is a perspective view of the seat in a collapsed configuration.

Turning now to FIGS. 5 and 6, a further embodiment of a vehicle seat 110 similar to the seat 10 discussed above, is shown in which the support bodies 122 are moveable in respective directions normal to the corresponding secondary seating surfaces 158. In particular, the secondary body 122 within cushion 112 may be moveable in vertical direction 160 and the secondary body 122 within seatback 114 may be moveable in longitudinal direction 168 during reconfiguration of seat 110 out of the extended configuration. In this manner, as shown in FIG. 5, when seat 110 is in the extended configuration, the secondary seating surface 158 may be co planar with the corresponding portions of the primary seating surface 156 (i.e. within cushion 112 and seatback 114 respectively). When seat 110 is moved out of the extended position, the secondary bodies 122 may respectively move in the vertical direction 160 and the longitudinal direction 168 to align the secondary bodies 122 with the cavities 118 (FIG. 7A) in the associated base bodies 116*a* and 116*b*, as shown in FIG. 6. This arrangement facilitates collapsing of secondary bodies 122 into base bodies 116*a* and 116*b* and movement of seat 110 into the collapsed configuration, resulting in a configuration similar to that of seat 10 shown in FIG. 3.

Figure 7A:
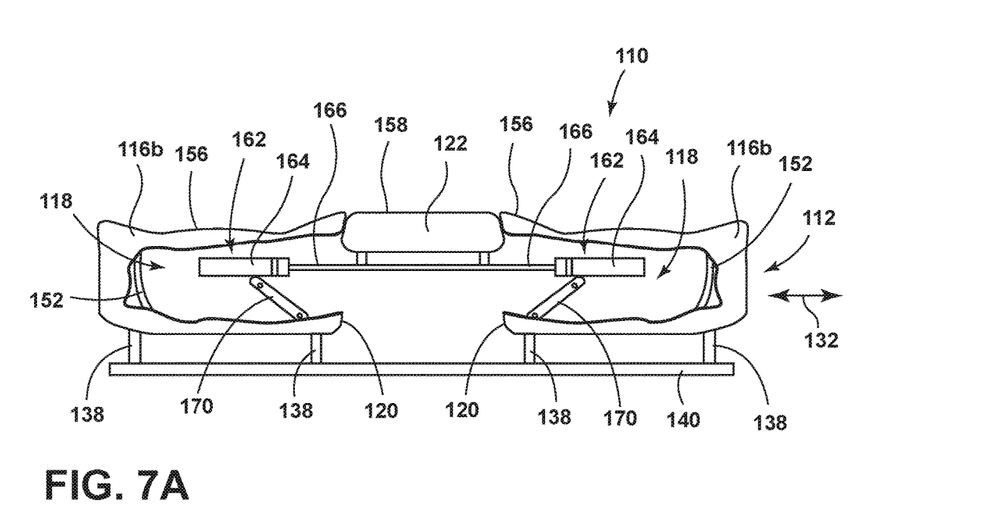
FIG. 7A is a front, partial cutaway view of the cushion of the seat in the expanded configuration showing various internal structures thereof.
Figure 7B:
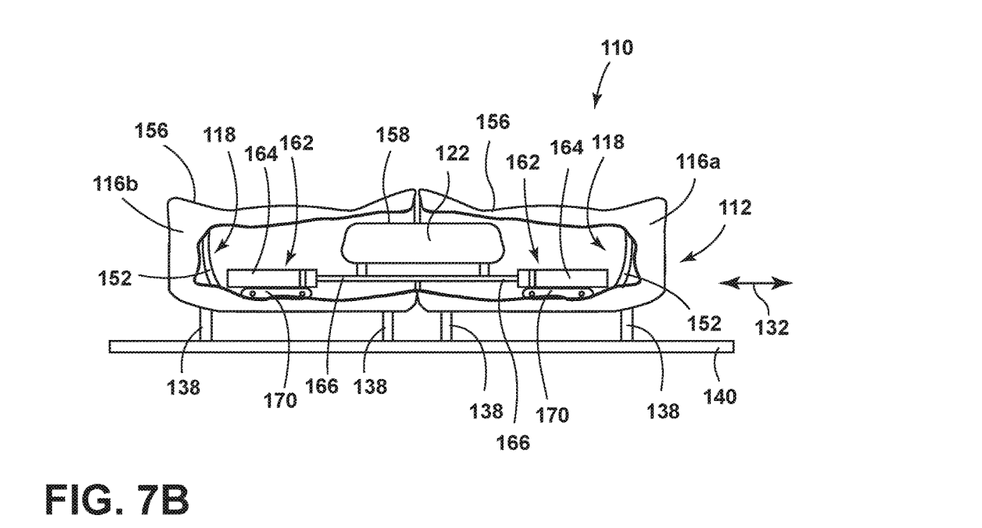
FIG. 7B is a front, partial cutaway view of the cushion of the seat in the collapsed configuration showing various internal structures thereof.
Figure 8:
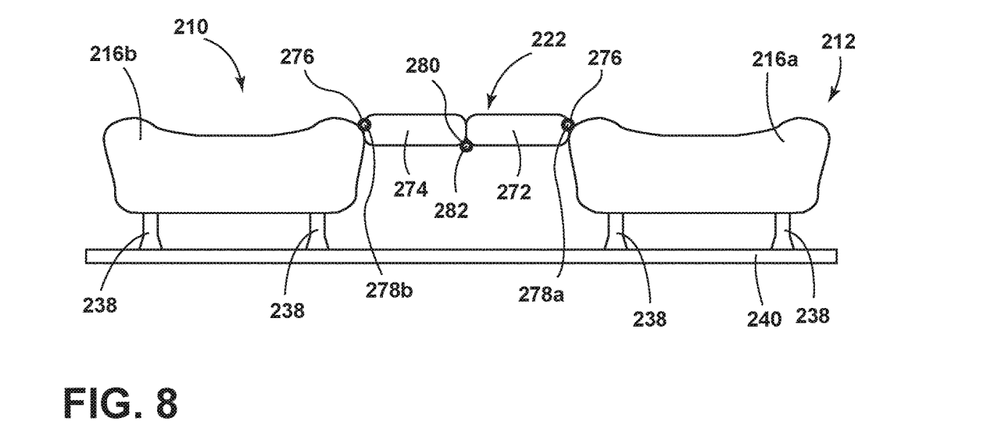
FIG. 8 is a front view of the cushion of a seat according to a further aspect in an expanded configuration thereof.

As shown in FIGS. 7 and 8, the movement of secondary body 122 within cushion 112 in the vertical direction 160 (FIG. 5) can be achieved by mounting extension members 162 in a manner such that retention portions 164 and, accordingly, telescoping portions 166 move in vertical direction 160 during an initial portion of movement of base body 116a, for example in lateral direction 132. In the example shown, retention portions 164 can be coupled with support structures 152 by linkage members 170 that are rotatably coupled with retention portions 164 and support structures 152, such linkage members 170 being sized to lift extension members 162 through the desired vertical distance by rotation thereof through a predetermined angle of less than 90° (to prevent binding). In the example shown, linkage members 170 are retained in an upwardly-rotated position (FIG. 7A) by the fixed length of extension members 162 in the extended configuration thereof. This arrangement serves to retain secondary body 122 in the upward position with secondary seating surface 158 aligned with primary seating surfaces 156.

As shown in FIG. 7B, when base body 116a is moved toward base body 116b, linkage members 170 are allowed to rotate outwardly, thereby lowering extension members 162 and secondary body 122. Subsequently, telescoping portions 166 slide into retention portions 164, allowing base body 116a to move into contact with or close proximity to base body 116b to achieve the collapsed condition of seat 110 shown. Opposite movement of base body 116a away from base body 116b extends telescoping portions 166 from retention portions 164 until the limited travel provided thereby reaches an endpoint before base body 116a is fully moved into the extended position. In this manner, further movement of base body 116a in lateral direction 132 causes upward rotation and corresponding upward vertical movement of secondary body 122 to return to the configuration depicted in FIG. 7A. It is noted that similar movement can be achieved with other structures in place of linkage members 170, including angled tracks or the like. Further, additional linkage members 170 can be coupled between extension members 162 and support structures 152 to further constrain the movement of extension members 162 to the desired path and to provide additional support for secondary body 122 in the elevated position of FIG. 7A. A similar arrangement can be used in seatback 114 to achieve the desired movement of the secondary body 122 therein in the longitudinal direction 168.

Figure 9:
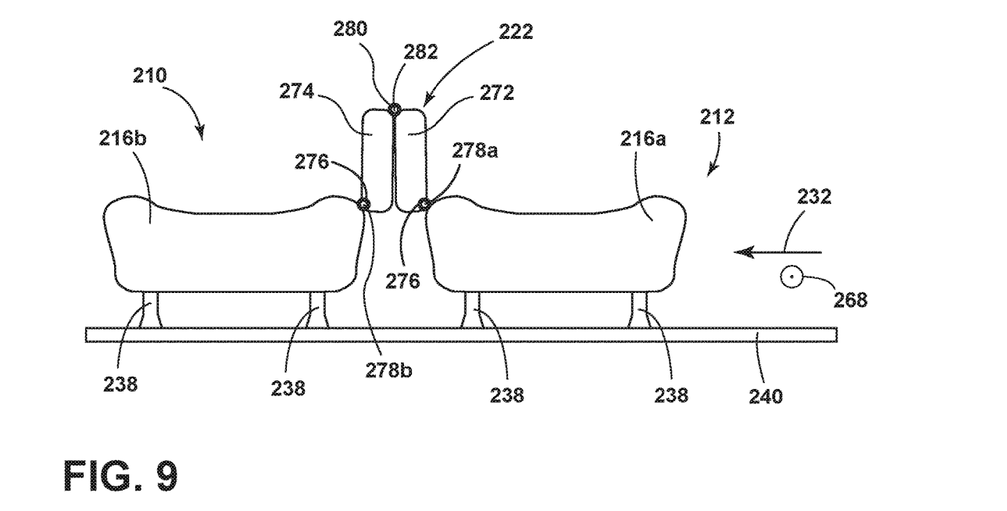
FIG. 9 is a front view of the seat in a collapsed configuration.

A still further embodiment of seat 210 is shown in FIGS. 8 and 9, wherein secondary body 222 collapses by folding, rather than by movement into base bodies 216a or 216b. As shown, such a secondary body 222 can be split into lateral sections 272 and 274, each lateral section 272 and 274 being respectively rotatably coupled with the adjacent base bodies 216a and 216b and, further, rotatably coupled together to achieve the folding movement depicted between FIGS. 8 and 9 to accommodate inward movement of either of the base bodies 216a or 216b. As shown, the rotational coupling of lateral sections 272 and 274 with the respective base bodies 216a and 216b can be achieved by hinges 276 extending along axes 278a and 278b that extend parallel to each other and generally in the longitudinal direction 268. Similarly, lateral sections 272 and 274 can be coupled together by a central hinge 280 extending along an axis 282 that is also parallel with axes 278a and 278b. As shown, the hinges 276 and 280 can be vertically staggered with respect to central hinge 280 to provide support for lateral sections 272 and 274 in the extended position of FIG. 8 and to allow upward rotation of lateral sections 272 and 274 during folding of secondary body 222.

The secondary body 222 of seatback (not shown) can be similarly configured with hingedly-coupled lateral sections 272 and 274 to accommodate folding thereof. In an embodiment, the secondary body 222 of the seatback can be configured to fold by rotation of the lateral sections 272 and 274 in a rearward direction to avoid interference with the folding of the secondary body 222 within cushion 212. In a further alternative embodiment, a folding secondary body 222 can be combined with one of the sliding secondary bodies 22 or 122, discussed above, with the folding secondary body 222 being incorporated in either the cushion 12 or 112 or the seatback 14 or 114 and the sliding secondary body 22 or 122 incorporated in the other of the seatback 14 or 114 or cushion 12 or 112.

Figure 10:
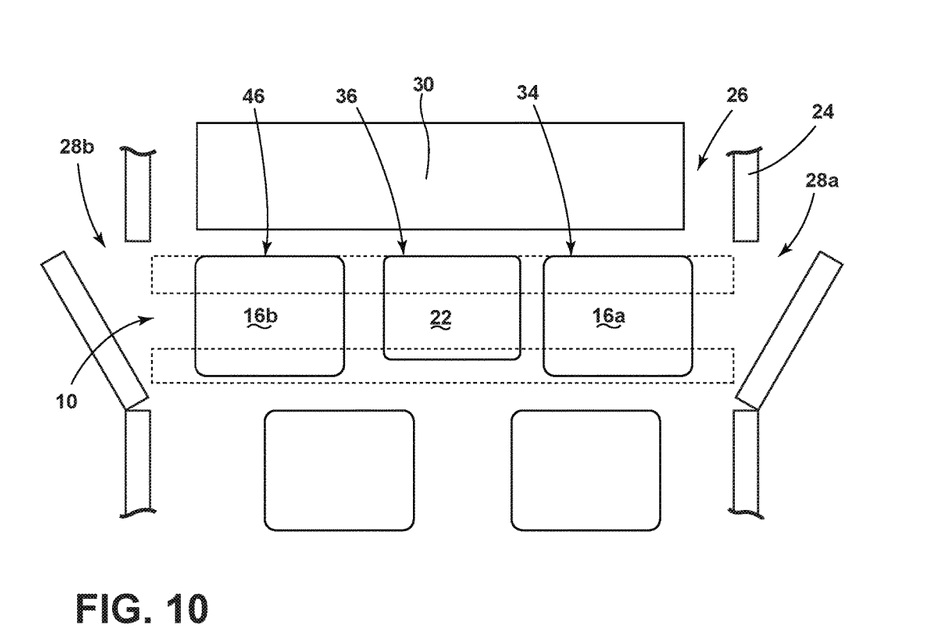
FIG. 10 is a schematic view of a vehicle interior including a seat according to any of the various aspects.
Figure 11:
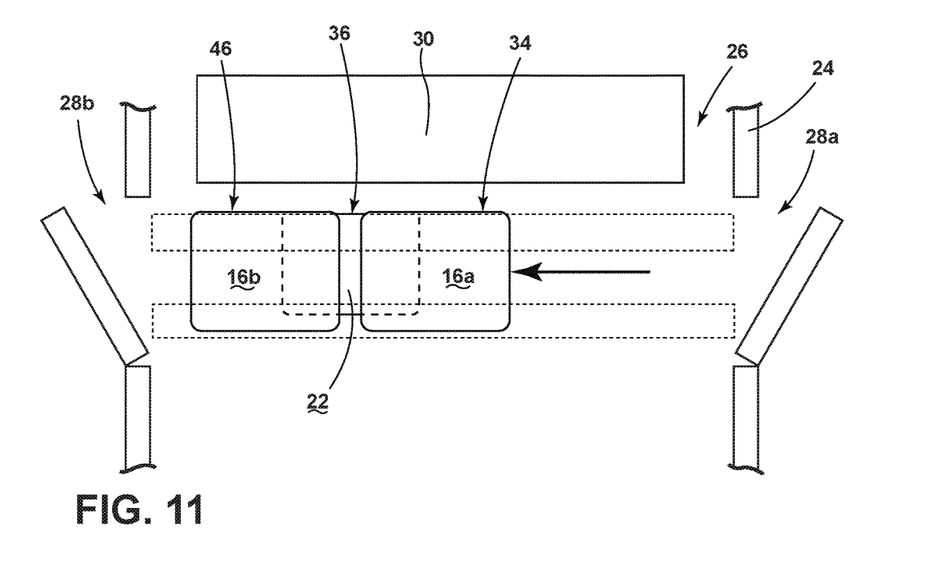
FIG. 11 is a schematic view of the vehicle interior including the seat in a first collapsed configuration.
Figure 12:
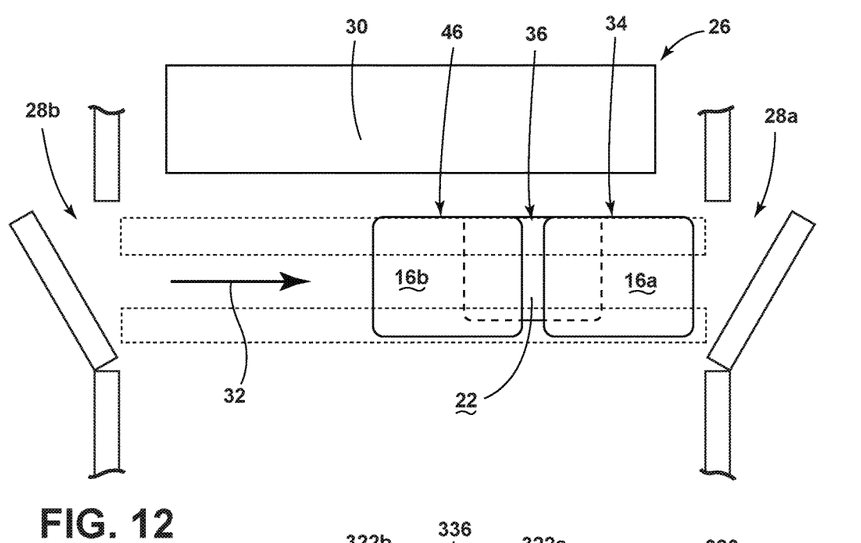
FIG. 12 is a schematic view of the vehicle interior including the seat in a second collapsed configuration.

The reconfiguration of seat 10 is shown schematically in FIGS. 10-12, such reconfiguration also being possible with the seat 110 shown in FIGS. 5-7B, as well as the seat 210 shown in FIGS. 8 and 9 and the potential additional seats discussed above incorporating combinations of the features of the seats. In particular, as shown in FIG. 10, when in the extended configuration, seat 10 may obstruct access to the rear, or third row, seat 30 by way of door 28a. Accordingly, the adjacent first side portion 34 can be slid inwardly away from door 28a to allow access to third row 30 therethrough. As discussed above, the collapsing of central portion 36 into first side portion 34 and second side portion 46 allows such lateral movement, shown in FIG. 11. In a similar manner, first side portion 34 can be left in the outward position, while second side portion 46 is slid inwardly in lateral direction 32 away from door 28b to allow access to third row 30 through door 28b. Again, this sliding movement is accommodated by collapsing of central portion 36 into first side portion 34 and second side portion 46.

Figure 13:
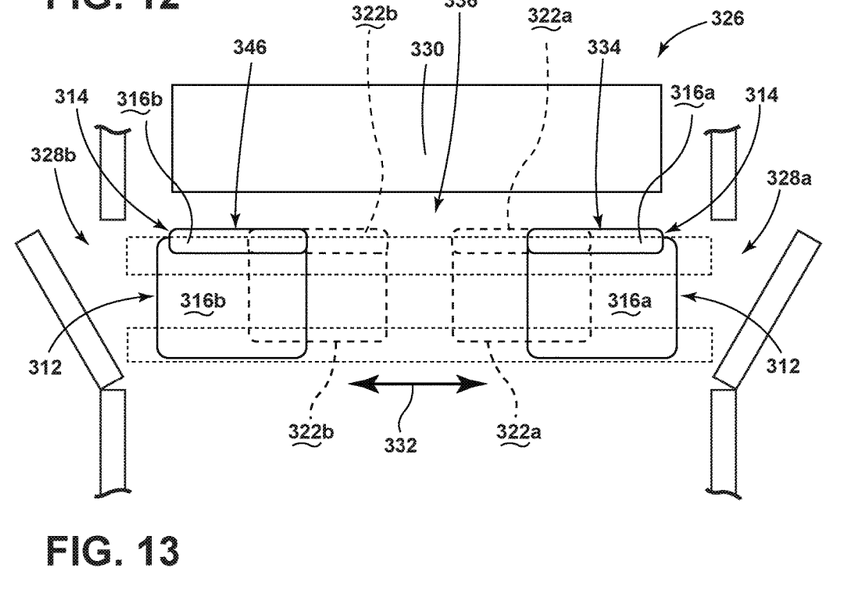
FIG. 13 is a schematic view of a vehicle interior including a seat according a still further aspect.

A further arrangement for a seat 310 is depicted schematically in FIG. 13 in which first and second side portions 334,346 are fixed in lateral direction 332. In such an arrangement, each of the base bodies 316a and 316b included within both the seatback 314 and cushion 312 can have slidably coupled therewith a separate corresponding secondary body 322a and 322b that each forms approximately half of the central portion 336 of seat 310. In this manner, the secondary bodies 322a and 322b can be respectively slid outwardly away from each other and into the corresponding base bodies 316a and 316b to open central portion 336 for access to third row 330 through either door 328a or 328b.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle seat, comprising:
   a cushion coupled with a seatback,
   each of the seatback and the cushion including:
      a respective base body defining an internal cavity open on a side of the base body; and
      a respective secondary body slidably mounted with the respective base body so as to be extendible out of the respective internal cavity beyond the side of the respective base body and retractable at least partially within the respective internal cavity.

2. The vehicle seat of claim 1, wherein:
   each of the seatback and the cushion respectively includes a support structure and a coverstock defining a first seating surface;
   the respective base body included in one of the seatback and the cushion includes the support structure and the coverstock of one of the seatback and the cushion; and
   the respective internal cavity is defined by the respective support structure and is inside the coverstock of one of the seatback and the cushion.

3. The vehicle seat of claim 1, wherein one of the seatback and the cushion includes an extension member coupled between the base body and the secondary body.

4. The vehicle seat of claim 3, wherein the extension member includes a retention portion coupled with the respective base body and a telescoping portion slidably received with the retention portion and coupled with the respective secondary body.

5. The vehicle seat of claim 1, wherein the base bodies each define a first seating surface and the secondary bodies each define a second seating surface positionable laterally adjacent to the respective first seating surface by extension of the respective secondary body.

6. The vehicle seat of claim 5, wherein each secondary body is also moveable with respect to the respective base body in a direction normal to the respective first seating surface to align the respective second seating surface with the respective first seating surface in the direction normal to the respective first seating surface when the secondary body is extended out of the cavity and to position the respective second seating surface below the respective first seating surface when the secondary body is retracted at least partially within the cavity.

7. The vehicle seat of claim 1, wherein:
   each base body is a first base body; and
   each of the seatback and the cushion further includes a second base body defining an internal cavity open on a side of the second base portion facing the side of the respective first base body, the respective secondary body being further slidably mounted with the second base body so as to be extendible out of the internal cavity of the second base body beyond the side thereof and retractable at least partially within the cavity of the second base body.

8. The vehicle seat of claim 7, wherein the seat is configurable between:
   a first condition, wherein portions of the secondary bodies are respectively retracted within the internal cavities of the respective first base body and the respective second base body; and
   a second condition, wherein the secondary bodies are extended from the cavities of both the respective first base body and the respective second base body.

9. The vehicle seat of claim 8, wherein the seat defines a first width in the first condition and a second width in the second condition, the second width being greater than the first width.

10. A vehicle seat assembly, comprising:
    a first side portion including a first cushion and a first seatback;
    a second side portion including a second cushion and a second seatback and slidably mounted with respect to the first side portion, wherein at least one of the first side portion and the second side portion defines an internal cavity; and
    a central portion coupled between at least one of the first and second cushions or the first and second seatbacks of the first side portion and the second side portion and collapsible during sliding of the second side portion toward the first side portion.

11. The vehicle seat assembly of claim 10, wherein the central portion is slidably mounted with the internal cavity so as to be extendible out of the internal cavity and is collapsible by retracting at least partially within the cavity.

12. The vehicle seat assembly of claim 11, further including an extension member coupled between the central portion and the at least one of the first side portion and the second side portion, wherein:
    the extension member slidably mounts the central portion with the internal cavity.

13. The vehicle seat assembly of claim 10, wherein the central portion defines a first section and a second section;
    the first section is hingedly coupled with the at least one of the a cushion or a seatback of the first side section along a first axis;
    the second section is hingedly coupled with the at least one of the cushion or the seatback of the second side section along a second axis;

the first section and the second section are hingedly coupled together along a third axis; and the central portion is collapsible by rotation of the first section and the second section respectively about the first axis and the second axis, the first, second, and third axes being parallel.

14. The vehicle seat assembly of claim 10, wherein the central portion is extendible during sliding of the second side portion away from the first side portion.

15. The vehicle seat assembly of claim 14, wherein:
the seat is configurable in a first condition including collapsing of the central portion and sliding of the second side portion into contact with the first side portion, wherein the seat defines a first width;
the seat is configurable in a second condition including extension of the central portion and sliding of the second side portion away from the first side portion, wherein the seat defines a second width; and
the second width is greater than the first width.

16. The vehicle seat assembly of claim 10, further including a track with which the first and second side portions are slidably coupled, wherein:
the coupling of the second side portion with the track slidably mounts the second side portion with respect to the first side portion; and
the second side portion is retainable in the first condition and the second condition by releasable fixation with the track.

17. A vehicle, comprising:
a seat, including:
a cushion; and
a seatback coupled with the cushion;
wherein the cushion includes:
a first base body defining an internal cavity open on a side of the base body; and
a secondary body slidably mounted with the base so as to be extendible out of the cavity beyond the side of the base body and retractable at least partially within the cavity; and
wherein the seatback includes a second base body defining an internal cavity open on a side of the second base body facing the side of the first base body, the secondary body being further slideably mounted with the second base body so as to be extendible out of the internal cavity of the second base body beyond the side thereof and retractable at least partially within the cavity of the second base body.

18. The vehicle of claim 17, wherein:
the seat is configurable among a first condition in which portions of the secondary body are respectively retracted within the internal cavities of the first base body and the second base body and a second condition in which the secondary body is extended from the cavities of both the first base body.

19. The vehicle of claim 18, further defining a pair of oppositely disposed rear doors and a third row bench seat positioned longitudinally behind the rear doors, wherein:
at least the first base body is slidably mounted within the vehicle so that the seat is moveable between the first configuration and with first base body positioned away from the door and the second condition with the first base body positioned adjacent the door.

\* \* \* \* \*